Patented Apr. 2, 1940

2,196,135

UNITED STATES PATENT OFFICE 2,196,135

ABRADANT

Karl Wolf, Heidelberg, and Franz Grom, Frankfort-on-the-Main, Germany, assignors to I. G. Farbenindustrie Aktiengesellschaft, Frankfort-on-the-Main, Germany No Drawing. Application May 11, 1938, Serial No. 207,362. In Germany October 25, 1933

4 Claims. (Cl. 51—280)

The present invention relates to abradants.

This application is a continuation-in-part-application to application Serial No. 748,764 filed October 17, 1934.

We have found that excellent abradants, both as emery-coated sheet materials, such as emery paper, and as grinding wheels are obtained if there are used as binding agents the condensation products of a compound selected from the group consisting of maleic acid and its anhydride with a modified castor oil resulting from dehydration of the original oil and containing conjugated double bonds and containing less hydroxy groups than normal castor oil. The dehydration of castor oil may be attained, according to known methods, by heating castor oil for a more or less long period of time to an elevated temperature, if required in the presence of a metallic catalyst, or by blowing castor oil. The separation of water may be effected until pure ricinenic acid triglyceride (octadienic acid-9-11-triglyceride) is obtained.

During the condensation of the said transformation products of castor oil with maleic acid or maleic anhydride which occurs at about 80° C. to 150° C. there are likewise first produced, as described in German Patent No. 479,965, more or less viscous, oily bodies which are soluble in solvents, such as benzene, toluene, alcohol, acetone, or the like and which, on further heating them to a temperature of about 80° C. to 170° C., preferably to a temperature of about 100° C. to 130° C., are likewise transformed into an elastic, gumlike or leather-like condition.

The particular advantage in using as binding agents the above-mentioned transformation products of castor oil resides in the fact that the condensation to obtain the soluble intermediate stage as well as the duration until the insoluble final product is obtained may be considerably shortened. For instance the condensation of castor oil with maleic acid requires about 10 to 12 hours until the soluble intermediate stage is attained, whereas this intermediate stage is already attained after about 5 to 8 hours, if thickened castor oil is used. The hardening of the first-named product requires a heating of about 15 hours when applied in a thin layer, whereas in the second case under same conditions a heating of only 5 to 10 hours is necessary. If converted castor oil is used, the bounding strength of the final product is far superior to that of the product prepared with ordinary castor oil.

In the making of emery-coated sheet materials any substrata usual for the said purpose may be used, for example paper, such as kraft paper, manila paper, or vulcan fibre, fabric or metal discs. When making water-proof abradants with the use of paper or fabric as a substratum, the latter may previously be impregnated with a water-repelling agent, for example with albuminous substances which are subsequently treated with formaldehyde, or with solutions of water-repelling resins, bitumina, waxes and the like.

Suitable abradants are, for example, silicon carbide, aluminum oxide, boron carbide, niobium carbide, garnet, flintstone, quartz and emery.

Preparatory to applying the binding agent on the substratum it may either be fused and then applied in the heat, or dissolved, for example in benzine, alcohol or acetone and then applied, subject to its concentration, either in the cold or heat. The application may be by pouring, rolling or by means of a spraying pistol. When applying cold solutions by means of a spraying pistol, solutions of relatively slight concentration, for example solutions of 20 per cent strength should be employed.

In the making of water-proof emery papers with the use of untreated papers as a substratum, the procedure is to impregnate the papers with the same solution as it is to be used as a binding agent for the emery grains, to harden to such an extent that the impregnation is deprived of its tackiness, to apply by means of a roller the binding agent for the grains and, the solvent likewise contained in the binding agent having been evaporated, the grains themselves, to heat to make the grains sink in and to harden until the binding agent has become difficultly soluble. The final steps are to apply the sizing layer by means of a roller and to finish hardening of the paper thus obtained. If the sizing layer be applied by means of a spray pistol, the binding agent need not be intermediately hardened to the difficultly soluble state. The temperatures chosen for hardening the papers preferably range between 100 and 130°, especially between 115 and 125° C.; the hardening of the first impregnation takes about 1 hour, the intermediate hardening after the application of the emery grains takes about 4 hours and the ultimate hardening about 8 to 10 hours. The time of hardening may also be prolonged, if desired, whereby the papers are rendered even more stable.

For making grinding wheels the binding agent may be passed into a dissolved or fused state and thus mixed with the emery grains in a mixing apparatus, for example in a kneading machine. The binding agent may also be further condensed, prior to mixing, until a rubber-like condition has been attained and the emery grains then incorporated therein by means of a roller. The mixture is pressed in moulds and then hardened either in the mould itself or after having been removed therefrom. In the case of mixtures made with the use of partially hardened binding agents it is frequently sufficient that the grinding discs be stamped out of the plates obtained on the roller.

The final hardening is preferably effected at about 130 to 170° and takes from about 10 to 30 hours depending on the hardness and elasticity desired.

The abradants, especially the emery papers prepared with the aid of the present new binding agents have been tested in comparison with the products made in known manner. In these tests roughened surfaces of metal sheets were ground. The grinding operations were performed under the same load of the emery papers and with the same velocity. The lengths of the surfaces of the metal sheets which were required to wear off the emery grains at any place of the emery papers were measured. The binding agent described in Example 1 was for instance compared with a binding agent prepared by condensation of tung oil with maleic acid. When both emery papers containing the binding agents had been heated for 15 hours at 110° C. (to effect the hardening of the binding agent) the paper prepared with a binding agent according to Example 1 showed an effect about 30 per cent better than that of a paper containing the known condensation product of tung oil with maleic acid. When, however, both emery papers had been hardened at 130° C., the paper according to Example 1 showed a still better effect than in the test mentioned above, whereas the paper containing the condensation product of tung oil with maleic acid was useless for grinding purposes on account of its brittleness and its tendency of splintering.

The following examples serve to illustrate the invention, but they are not intended to limit it thereto, the parts being by weight:

Example 1

31 parts of a castor oil which has previously been heated for 12 hours to 150° C. to 160° C. are heated for about 7 to 8 hours to 120° C. to 130° C. together with 10 parts of maleic anhydride. After this period there is obtained a yellow, viscous oil having the acid number 97 to 100. On further heating this oil to about 130° C. it is transformed after about 7 to 8 hours into an elastic gumlike mass.

Example 2

30 parts of a blown castor oil having the acid number 18, the saponification number 221 and the acetyl number 142 are heated to 120° C. to 130° C. together with 10 parts of maleic anhydride. After 4 hours there is obtained a viscous oil of the acid number 90 to 100. On further heating this oil to 120° C. to 130° C., while adding 1 per cent of benzoyl peroxide, a gumlike, insoluble, elastic mass is obtained already after 3 to 4 hours.

Example 3

100 parts of castor oil which has been pretreated by heating it to a raised temperature in the presence of a catalyst capable of splitting off water until it is soluble in mineral oil and which chiefly consists of the triglyceride of ricinenic acid are heated to 120° C. to 130° C. together with 35 parts of maleic acid. After the maleic acid has been dissolved, the evolution of water vapors begins and after about 3 to 6 hours a gumlike mass is obtained.

Example 4

30 parts of castor oil which has been rendered soluble, in the manner described in Example 3 in mineral oil are heated to 100° C. to 110° C. together with 10 parts of maleic anhydride. After a short time the entire reaction mass turns into a gumlike condition.

Example 5

Kraft paper of 110 grams per square meter is impregnated at about 70° C. with a 70 per cent solution of the condensation product from previously heated castor oil and maleic acid anhydride described in Example 1, passed through 2 rollers whereby the excess of impregnating agent is removed, and then heated for 1 hour at from 60° to 110° C. Then a thin layer of the fused condensation product is brought on to the impregnated paper at about 100° C. by means of a roller. After strewing the grains, the paper is passed over a heating plate at 120° C. and kept in a hardening chamber at between 100 and 110° for 4 hours. Then the grain-fitted side of the material is covered, by means of a felt-lined roller, with a sizing layer consisting of a cold solution of a binding agent of about 35 per cent strength. Finally the paper is hardened at 120° C. for 10 hours.

Example 6

An about 20 per cent solution of the condensation product described in Example 2 having an acid number of 90 to 100 is applied on a web of paper by means of a spraying pistol. After the solvent has been evaporated the grains are applied, the aggregate is heated until the grains have sunk in and then the sizing layer is applied by means of a spraying pistol without an intermediate hardening while using a solution of the same condensation product which was used as binding agent for the abradant material. For rendering the back side of the paper waterproof, a 20 per cent solution of the said binding agent is applied thereon by means of a spraying pistol either simultaneously with or after the application of the sizing layer. The waterproofing layer should be so thin that only the paper fibers are impregnated with the binding agent, but that a coherent layer of binding agent is formed on the surface of the paper. The aggregate is then heated at 118° C. for 15 hours.

What we claim is:

1. Emery-coated sheet material containing as binding agents the products obtained by condensing a compound selected from the group consisting of maleic acid and its anhydride with a modified castor oil resulting from dehydration of the original oil and containing conjugated double bonds and containing less hydroxy groups than normal castor oil.

2. Emery-coated sheet material containing as binding agents the products obtained by condensing a compound selected from the group consisting of maleic acid and its anhydride with a modified castor oil resulting from dehydration of the original oil and containing conjugated double bonds and containing less hydroxy groups than normal castor oil and subjecting the condensation product thus obtained to a further heating at the condensation temperature.

3. Emery-coated sheet material containing as binding agents the products obtained by condensing at a temperature of between 80° C. and 150° C. a compound selected from the group consisting of maleic acid and its anhydride with a modified castor oil resulting from dehydration of the original oil and containing conjugated double bonds and containing less hydroxy groups than normal castor oil.

4. Emery-coated sheet material containing as binding agents the products obtained by condensing at a temperature of between 80° C. and 150° C. a compound selected from the group consisting of maleic acid and its anhydride with a modified castor oil resulting from dehydration of the original oil and containing conjugated double bonds and containing less hydroxy groups than normal castor oil, and subjecting the condensation product thus obtained to a further heating at the same temperature.

KARL WOLF.
FRANZ GROM.